US012679122B2

(12) United States Patent
Ueyama et al.

(10) Patent No.: US 12,679,122 B2
(45) Date of Patent: Jul. 14, 2026

(54) PRINTING DEVICE

(71) Applicant: SEIKO EPSON CORPORATION, Tokyo (JP)

(72) Inventors: Naohiro Ueyama, Matsumoto (JP); Yuya Yumoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 179 days.

(21) Appl. No.: 18/440,740

(22) Filed: Feb. 13, 2024

(65) Prior Publication Data

US 2024/0270003 A1 Aug. 15, 2024

(30) Foreign Application Priority Data

Feb. 14, 2023 (JP) ................................ 2023-020589

(51) Int. Cl.

*B41J 2/17* (2006.01)
*B41J 2/165* (2006.01)
*B41J 29/13* (2006.01)
*B41J 29/377* (2006.01)

(52) U.S. Cl.

CPC ........... *B41J 29/13* (2013.01); *B41J 2/16508* (2013.01); *B41J 2/1714* (2013.01); *B41J 29/377* (2013.01)

(58) Field of Classification Search

CPC ...... B41J 2/16508; B41J 2/1714; B41J 29/02; B41J 29/13; B41J 29/377
See application file for complete search history.

(56) References Cited

U.S. PATENT DOCUMENTS

| | | | | |
|---|---|---|---|---|
| 2005/0253909 A1* | 11/2005 | Usui | B41J 2/175 | 347/92 |
| 2012/0301356 A1* | 11/2012 | Olson | A61L 2/22 | 422/291 |
| 2013/0328963 A1 | 12/2013 | Domae | | |
| 2020/0297907 A1* | 9/2020 | Meyer | A61M 1/1658 | |

FOREIGN PATENT DOCUMENTS

| | | |
|---|---|---|
| JP | 2012-179802 A | 9/2012 |

* cited by examiner

*Primary Examiner* — Anh T Vo
(74) *Attorney, Agent, or Firm* — WORKMAN NYDEGGER

(57) ABSTRACT

A printing device includes the carriage 24 that has disposed thereon the print head 25 configured to print on the medium and that is configured to move in the main scanning direction X and the housing 14 configured to accommodate the carriage 24, wherein the opening 31 is provided in the side surface section 14A of the housing 14 at a position that overlaps with the carriage 24 as viewed from the main scanning direction X.

19 Claims, 8 Drawing Sheets

PRINTING DEVICE

The present application is based on, and claims priority from JP Application Serial Number 2023-020589, filed Feb. 14, 2023, the disclosure of which is hereby incorporated by reference herein in its entirety.

BACKGROUND

1. Technical Field

The present disclosure relates to a printing device that includes a carriage on which a print head that performs printing on a medium is disposed.

2. Related Art

For example, JP-A-2012-179802 discloses a printing device (inkjet printer) that performs printing on a medium by ejecting liquid such as ink toward the medium. There is an opening section for air intake on the rear surface of the device exterior that constitutes the housing, and an internal air intake fan is mounted. The rear surface of the carriage is close to the rear surface of the exterior of the device and a carriage intake fan is mounted in an opening section for air intake on the rear surface of the carriage. The opening section is provided on the front surface of the carriage, which is the side on which a recording medium (an example of the medium) is discharged, and air inside the carriage is exhausted by a carriage exhaust fan. Such a configuration prevents an increase in the amount of ink mist.

However, in the printing device described in JP-A-2012-179802, since a removal mechanism including a fan such as a carriage intake fan and a duct is provided for discharging the ink mist, there is a problem that the size of the device tends to increase in order to secure an installation space for the removal mechanism. In some cases, inside the exterior of the device, floats dust such as paper powder and yarn fiber scattered from paper or fabric, which is an example of the medium. When the dust adheres to the print head, printing failure is likely to occur. Therefore, even in a laser printer, a dot impact printer, or the like other than the inkjet printer as the printing device, when the removal mechanism is provided for the purpose of removing the dust, there is a similar problem.

SUMMARY

To solve the above described problems, a printing device includes a carriage that has disposed thereon a print head configured to print on a medium and that is configured to move in the main scanning direction and a housing configured to accommodate the carriage, wherein an opening is provided in one side surface section amongst two side surface sections of the housing that face each other in the main scanning direction at a position that overlaps with the carriage as viewed from the main scanning direction.

DESCRIPTION OF EMBODIMENTS

Figure 1:
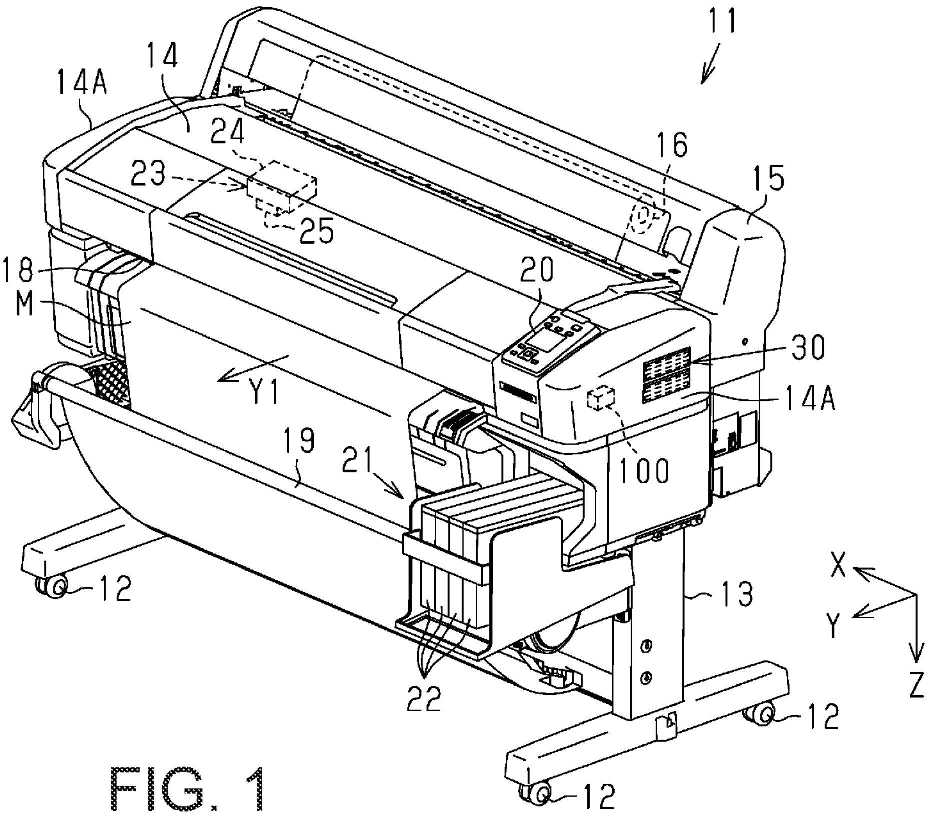
FIG. 1 is a perspective view showing a printing device according to a first embodiment.

Hereinafter, one embodiment of the printing device will be described with reference to the drawings. As shown in FIG. 1, a printing device 11 of the present embodiment is a serial scan type (serial printing type) printer. The printing device 11 is, for example, a large format printer. The printing device 11 is an inkjet printer that forms a dot group on a medium M (medium) such as paper or fabric by ejecting liquid droplets (for example, ink) in accordance with image data included in print data supplied from an external host computer, thereby printing an image (including characters, graphics, and the like).

In the present embodiment, in the printing device 11, the moving direction of a carriage 24 (to be described later) is referred to as a main scanning direction X, and the transporting direction of the medium M is referred to as a sub-scanning direction Y and a vertical direction Z. Since the main scanning direction X is also the width direction of the medium M, is also referred to as a width direction X. In addition, the main scanning direction X, the sub-scanning direction Y, and the vertical direction Z are described in the drawings as three axes orthogonal to each other, but the arrangement relationship of each configuration is not necessarily limited to the orthogonal relationship. In the example of FIG. 1, a vertically upward direction is a height direction −Z.

In the present embodiment, the large format printer is a printer capable of performing serial printing on the medium M having a A3 short side width of (297 mm) or more. Therefore, in the printing device 11, a printing unit 23 shown in FIG. 1 is capable of reciprocating in the main scanning direction X over a range of movement in which serial printing can be performed with a printing width equal to or greater than the A3 short side width. Note that the printing device 11 may be a small printer that can perform serial printing on medium M that is shorter than the A3 short side width.

Configuration of Printing Device 11

First, the schematic configuration of the printing device 11 will be described with reference to FIG. 1. As shown in FIG. 1, the printing device 11 includes a support stand 13 having casters 12 attached to a lower end thereof, and a substantially rectangular box-shaped housing 14 supported by the support stand 13. A roll body 16 in which a medium M such as an elongate paper sheet or fabric is wound in a cylindrical shape is loaded in a feeding section 15 which protrudes upward in a rear section of the housing 14. The medium M fed from the roll body 16 into the housing 14 by the feeding section 15 is transported in the transport direction Y1 indicated by an arrow in FIG. 1 by a transport device (transport section) (not shown) provided in the housing 14. The direction orthogonal to the transport direction Y1 of the medium M is the width direction X. The transport direction Y1 of the medium M is parallel to the sub-scanning direction Y in the housing 14, but changes according to the position on the transport path of the medium M.

The printing unit 23 prints characters or the image on the medium M transported by the transport device. The medium M after printing is cut into a predetermined length in the transport direction Y, and then, discharged from a discharge port 18 which is opened in a front surface section of the housing 14. The discharged medium M is received by a medium receiving unit 19 attached to a position lower than the discharge port 18. The medium M after printing may be wound as a roll body without being cut.

In addition, an operation panel 20 for a user to perform a setting operation and an input operation of the printing device 11 is provided on an end portion of an upper surface of the housing 14. The operation panel 20 includes a display section and operation buttons. The display section displays a menu, various messages for informing the user of the operating state of the printing device 11, and the like.

The printing device 11 includes a control section 100 that controls the transport device and the printing unit 23. The control section 100 controls the transport device and the printing unit 23 based on printing data received from a host device (not shown) or a printing instruction instructed by an operation of the operation panel 20.

A liquid accommodation unit 21 is provided at a lower portion of one end of the housing 14. A plurality of (four in the example of FIG. 1) liquid containers 22 (for example, ink cartridges or ink tanks) which contain ink as an example of liquid are attached to the liquid accommodation unit 21 in a state in which the liquid containers 22 can be detached and attached or can be replenished with liquid. The plurality of liquid containers 22 contain liquids (for example, inks) of different types (for example, colors). In an example in which the liquid is ink, the plurality of liquid containers 22 contain, for example, ink of a plurality of colors including black (K), cyan (C), magenta (M), and yellow (Y) one by one.

The printing unit 23 for printing on the medium M is provided in the housing 14. The printing unit 23 includes the carriage 24 configured to be movable in the main scanning direction X, and a print head 25 disposed on the carriage 24. The print head 25 performs printing on the medium M. In the carriage 24, the print head 25 is disposed at a position facing the transport path of the medium M. As shown in FIG. 1, the print head 25 may be positioned at the bottom of the carriage 24. The print head 25 may be, for example, an inkjet type print head. In this case, the print head 25 performs printing on the medium M by ejecting liquid droplets (ink droplets) onto the medium M.

The liquid (ink) of each color is supplied from each liquid container 22 to the printing unit 23 through a tube (not shown). The printing device 11 is not limited to an off-carriage type configuration in which the liquid accommodation unit 21 is attached to the housing 14, and may be an on-carriage type configuration in which the plurality of liquid containers 22 are attached to the carriage 24.

Schematic Configuration of Housing 14

Figure 2:
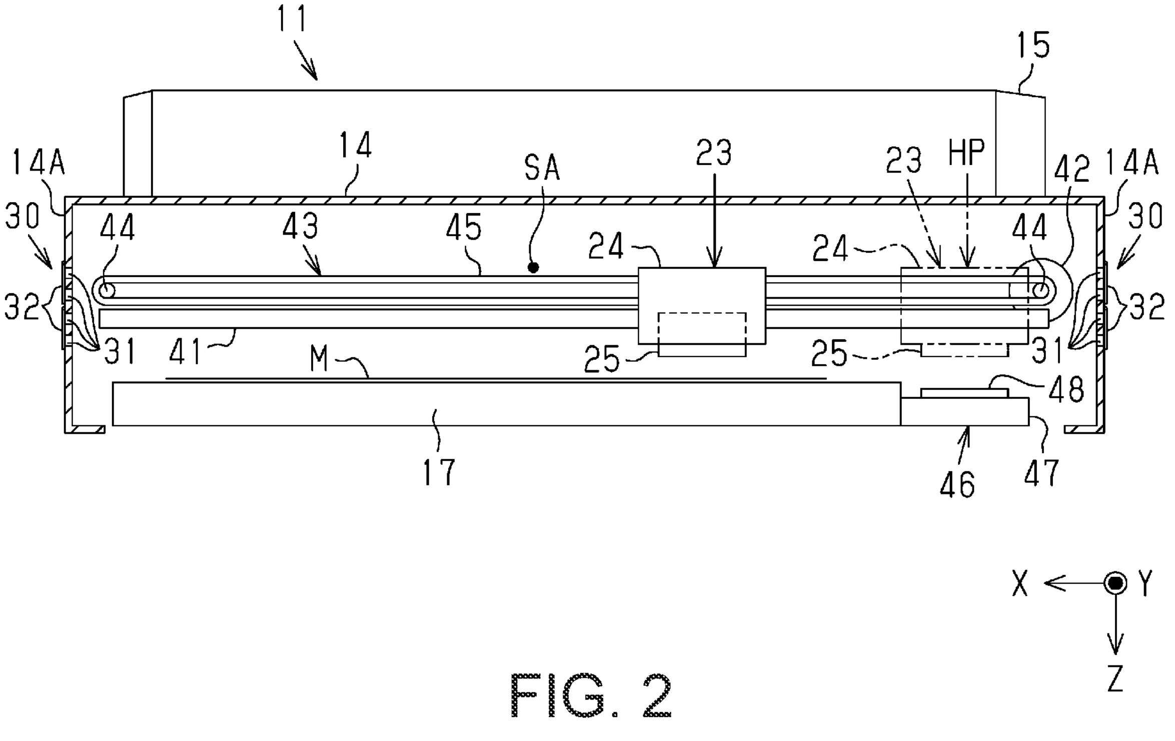
FIG. 2 is a schematic front cross-sectional view showing the general structure inside the housing of the printing device.

Next, a schematic configuration inside the housing 14 in the printing device 11 will be described with reference to FIG. 2. As shown in FIG. 2, the housing 14 covers a scanning area SA which is an area in which the carriage 24 and the print head 25 move in the main scanning direction X during printing. The printing device 11 includes a support section 17 that supports the medium M in the housing 14. The support section 17 is, for example, a platen which is a plate-shaped support member in which a rib (not shown) is formed on the upper surface. The support section 17 is not limited to the platen and may be an endless transport belt that transports the medium M by rotating in a state where the medium M is placed thereon. The transport belt may be wound around a plurality of rollers, and one of the drive rollers may be rotated by the power of a motor (not shown) to transport the medium M.

The housing 14 has two side surface sections 14A that face each other in the main scanning direction X. The side surface section 14A is provided with an exhaust mechanism 30. In this embodiment, the exhaust mechanisms 30 are provided on both of the two side surface sections 14A. The detailed structure of the exhaust mechanism 30 will be described later.

As shown in FIG. 2, the printing device 11 includes a guide rail 41 which guides the carriage 24 along a scanning path, a carriage motor 42 which is a driving source of the carriage 24, and a power transmission mechanism 43 which transmits power of the carriage motor 42 to the carriage 24. The power transmission mechanism 43 is, for example, a belt type power transmission mechanism. More specifically, the power transmission mechanism 43 includes a pair of pulleys 44, and a timing belt 45 wound around the pair of pulleys 44. The pulley 44 is connected to an output shaft of the carriage motor 42. The carriage 24 is fixed to a part of the timing belt 45.

The carriage 24 is configured to be able to reciprocate in the main scanning direction X along the guide rail 41 by the driving of the carriage motor 42. The print head 25 performs printing on the medium M supported by the support section 17 while the carriage 24 moves in the main scanning direction X. In the serial printing method, the image or the like is printed on the medium M by alternately performing a printing operation of performing printing for one line (one scanning) which is performed by the print head 25 ejecting ink in the movement process and a transporting operation of transporting the medium M to the next printing position by the transporting device.

The printing device 11 includes a maintenance section 46 for maintaining the print head 25. The carriage 24 stands at a home position HP which is a standby position indicated by a two dot chain line in FIG. 2 when printing is not performed. The maintenance section 46 is disposed at a position facing the print head 25 when the carriage 24 is at the home position HP. The maintenance section 46 includes a main body 47 and a cap 48 provided so as to be movable up and down with respect to the main body 47. The cap 48 faces the print head 25 when the carriage 24 moves to the home position HP.

The cap 48 is configured to be movable between a capping position at which the cap 48 is in contact with a nozzle surface 25A of the print head 25 and a retreat position shown in FIG. 2 at which the cap 48 is separated from the nozzle surface 25A by moving up and down with respect to the main body 47. The main body 47 is provided with a pump (not shown). By the pump is driven under the capping state in which the cap 48 is in contact with the nozzle surface 25A, cleaning for the forcibly discharging ink from nozzles 26 (see FIG. 3) of the print head 25 is performed. In addition, the carriage 24 moves regularly or irregularly to the home position HP during printing, and the print head 25 performs idle ejection in which liquid is ejected toward the cap 48. Details of the idle ejection will be described later.

Among the ink ejected from the nozzles 26 of the print head 25 during printing, ink droplets that are not used for printing the medium M but float or scatter are present in the housing 14. Therefore, as shown in FIG. 1, the printing device 11 is provided with the exhaust mechanism 30 on the side surface section 14A of the housing 14.

As shown in FIG. 2, the carriage 24 is provided so as to be movable between a printing position at which printing is performed on the medium M and a standby position to standby when the print head 25 does not perform printing. In the present embodiment, the standby position is the home position HP. The home position HP is provided with the maintenance section 46.

The central portion of the scanning area SA in the main scanning direction X is an area through which a plurality of types of medium M having different width sizes commonly pass. For this reason, the central portion of the scanning area SA is a region in which the ejection frequency of the ink from the print head 25 is high compared to both end portions.

During printing, the carriage 24 frequently moves in the central portion of the scanning area SA.

Detailed Configuration of Exhaust Mechanism 30

Figure 3:
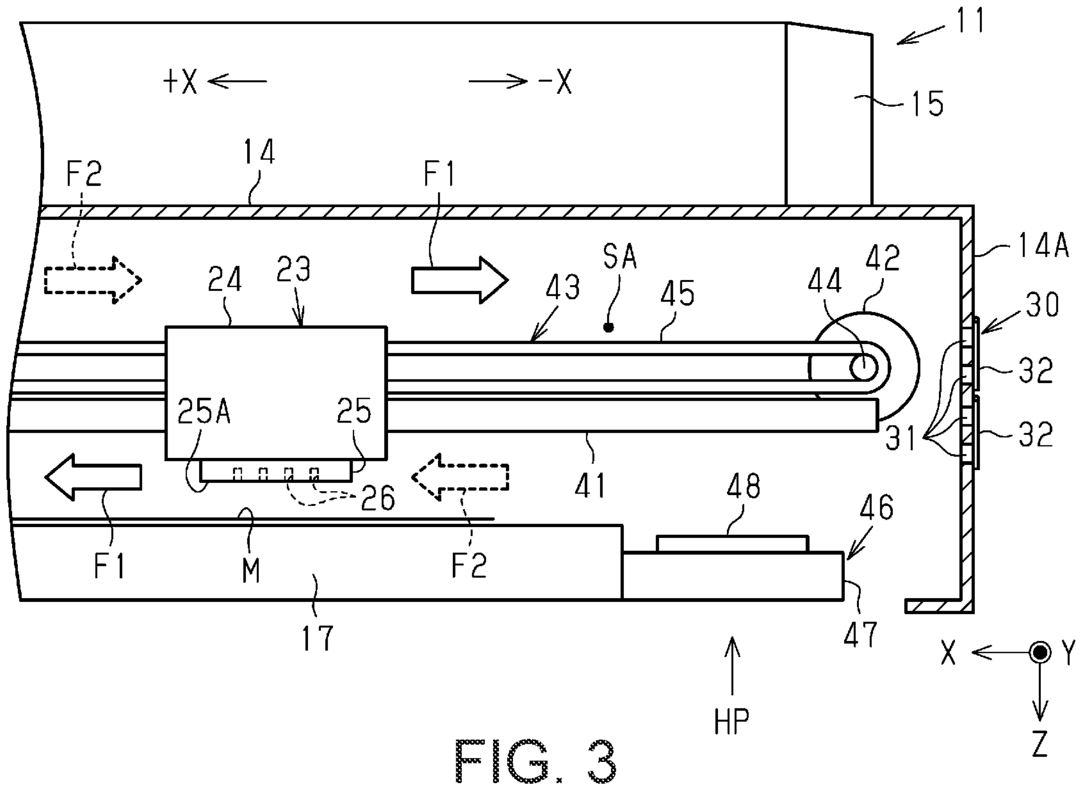
FIG. 3 is a schematic front cross-sectional view showing a configuration of a part of inside the housing.
Figure 4:
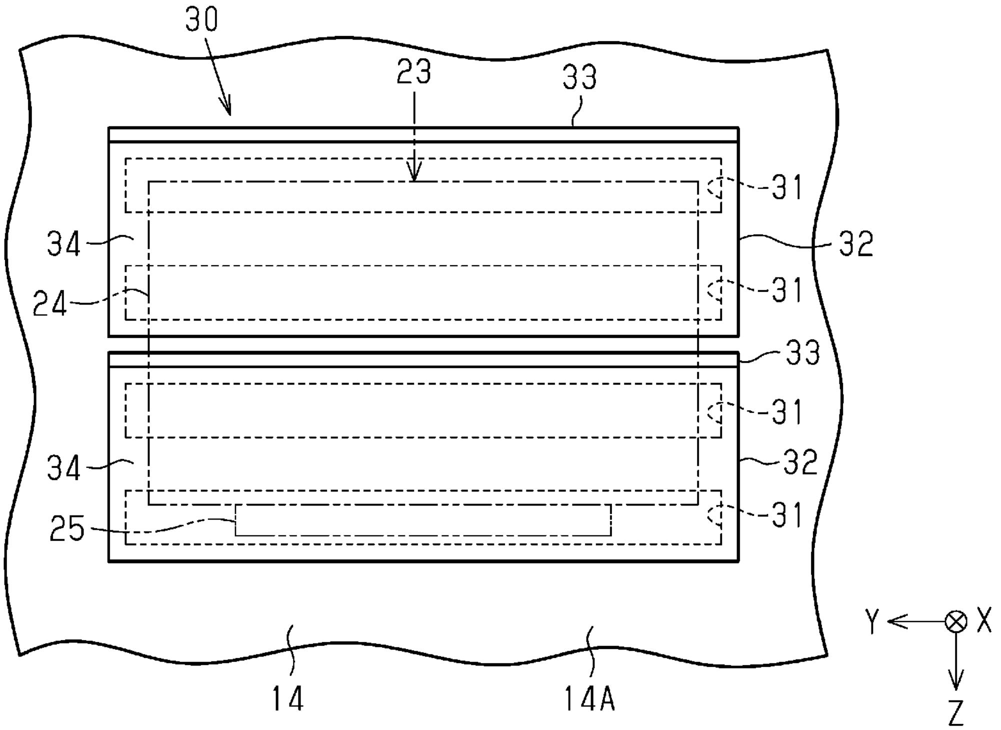
FIG. 4 is a schematic side view showing an exhaust mechanism.

Next, a detailed configuration of the exhaust mechanism 30 according to the first embodiment will be described with reference to FIGS. 3 and 4. As shown in FIGS. 3 and 4, the exhaust mechanism 30 includes openings 31 provided in the side surface section 14A and vent valves 32 for opening and closing the openings 31. The vent valves 32 are disposed outside the side surface section 14A. The vent valves 32 are configured, when the airflow generated in response to the movement of the carriage 24, to open when the airflow flows out of the housing 14, and to close when the airflow flows into the housing 14.

As shown in FIG. 3, when the carriage 24 moves in the main scanning direction X in the housing 14 (scanning area SA), a first airflow F1 in the same direction as the traveling direction of the carriage 24 is generated in front of the carriage 24 with respect to the traveling direction of the carriage 24 by the action pushing air, and a second airflow F2 in the same direction as the traveling direction is generated behind the carriage 24 with respect to the traveling direction by the action of carriage 24 drawing air.

More specifically, as shown in FIG. 3, when the carriage 24 moves in the −X direction toward the home position HP, the first airflow F1 in the −X direction is generated in front of the carriage 24 in the traveling direction. Further, a second airflow F2 in the −X direction is generated behind the carriage 24 with respect to the traveling direction of the carriage 24. On the other hand, when the carriage 24 moves in the +X direction away from the home position HP, the first airflow F1 in the +X direction is generated in front of the carriage 24 with respect the traveling direction of the carriage 24, and the second airflow F2 in the +X direction is generated behind the carriage 24 with respect to traveling direction of the carriage 24.

The vent valves 32, when the carriage 24 moves in a first direction approaching the openings 31, is opened by the first airflow F1 generated in front of the carriage 24 with respect to the traveling direction of the carriage 24, and when the carriage 24 moves in a second direction away from the openings 31, is closed by the second airflow F2 generated behind the carriage 24 with respect to the traveling direction of the carriage 24.

As shown in FIG. 4, the vent valve 32 has a pivot shaft 33 pivotably attached to the side surface section 14A, and a plate-shaped valve body 34 having one end fixed to the pivot shaft 33. The pivot shaft 33 is pivotably supported by a bearing section 35 (see FIG. 5) provided on the outer surface of the side surface section 14A.

In addition, as shown in FIG. 4, the openings 31 are provided at a position that overlaps with the carriage 24 shown by a two dot chain line in FIG. 4 as viewed from the main scanning direction X. In the present embodiment, the plurality of openings 31 are provided at positions that overlap with a part of the carriage 24 as viewed from the main scanning direction X. Specifically, a plurality of (for example, four in FIG. 4) elongated rectangular openings 31 having the transport direction Y as a longitudinal direction are disposed in the vertical direction Z. The vent valve 32 has a size that covers the plurality of openings 31 in the valve closed state. More specifically, in the valve closed state of the vent valve 32, two vent valves 32 for covering the two openings 31 are provided on outside the side surface section 14A.

Figure 5:
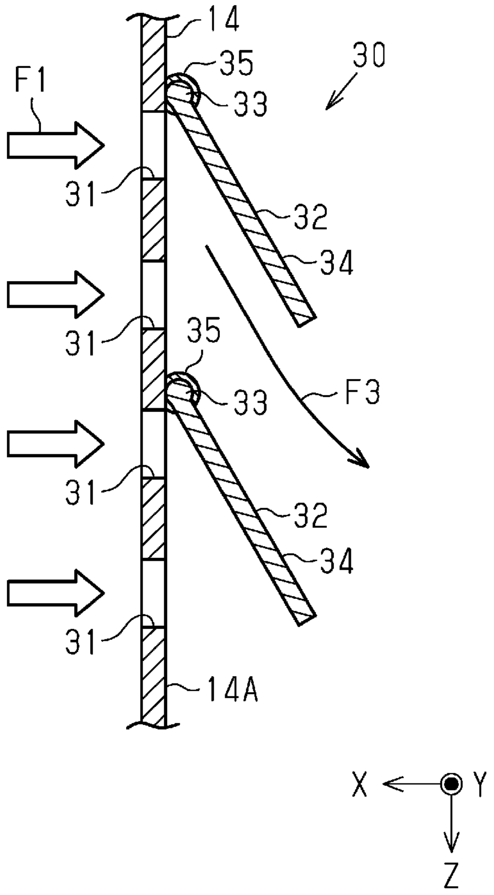
FIG. 5 is a schematic front cross-sectional view showing an exhaust operation when the carriage moves in a direction approaching the exhaust mechanism.

As shown in FIG. 5, the first airflow F1 generated in front of the carriage 24 (see FIG. 3) in the traveling direction opens the vent valves 32 and is discharged from the openings 31 as a third airflow F3. The mist or the dust in the housing 14 is discharged outside housing 14 together with the third airflow F3.

Figure 6:
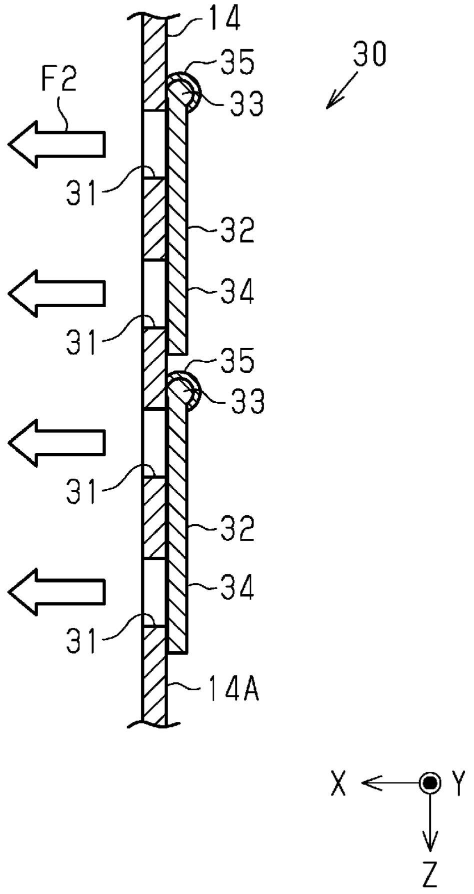
FIG. 6 is a schematic front cross-sectional view showing an inflow suppressing operation when the carriage moves in a direction away from the exhaust mechanism.

Further, as shown in FIG. 6, since the second airflow F2 generated behind the carriage 24 (see FIG. 3) with respect to the traveling direction of the carriage 24 acts on the vent valves 32 in the closing direction, the openings 31 are closed by the vent valves 32. Therefore, external air is prevented from flowing into the housing 14 through the openings 31.

As shown in FIG. 2, the openings 31 are provided on the side surface section 14A on the home position HP side which is the standby position of the carriage 24 in the housing 14. In the present embodiment, the openings 31 are provided in both the side surface section 14A on the home position HP side and the side surface section 14A (see FIG. 2) on the anti-home position (anti-standby position) side opposite to the home position HP side in the housing 14.

Here, as a reference position at which the medium M is transported in the main scanning direction X of the printing device 11, in general, there are a side alignment method in which an end portion on one side is used as a reference and a center alignment method in which the center is used as a reference. That is, as the transport method of the medium M, in the main scanning direction X (width direction X), there are the side alignment method in which the medium M is transported to one side of the scanning area SA and the center alignment method in which the medium M is transported to the center of the scanning area SA.

When the side alignment method, a plurality of types of medium M having different width sizes are transported in a state of being biased to one side of the scanning area SA. For this reason, when printing on the medium M, the carriage 24 reciprocates in an area shifted to one side in the housing 14. Therefore, a relatively large first airflow F1 is generated in the vicinity of the exhaust mechanism 30 on the side to which the medium M is shifted. Therefore, regardless of the width size of the medium M, the mist or the dust in the housing 14 is efficiently discharged from the openings 31 by the relatively large first airflow F1 generated in the vicinity of one of the exhaust mechanisms 30.

On the other hand, when the center alignment method, a region through which a plurality of types of medium M having different width sizes pass in common is a central region. Therefore, when the center alignment method, when printing is performed on the medium M having a small width size, the carriage 24 frequently reciprocates only in the central region of the scanning area SA. In this case, since the generation area of the first airflow F1 generated in the movement process of the carriage 24 is the central area away from the side surface section 14A, the discharge rate of discharging mist or the dust in the housing 14 from the exhaust mechanism 30 using the airflow generated by the carriage 24 is reduced.

Therefore, although the printing device 11 of the present embodiment is the center alignment method, even when printing is performed in which the carriage 24 reciprocates only in the central region of the scanning area SA, by the carriage 24 moves to the vicinity of the exhaust mechanism 30 at a predetermined frequency or more, the relatively large first airflow F1 is generated in the vicinity of the exhaust mechanism 30. Accordingly, the frequency at which the mist and the dust in the housing 14 can be discharged with high discharge efficiency during printing is secured to be equal to or higher than a predetermined frequency.

On the other hand, the printing by the print head 25 is performed by ejecting the ink from the nozzles 26 corresponding to the pixels of the image data included in the print data among all the nozzles 26. For this reason, all the nozzles 26 include nozzles 26 with a high ejection frequency, nozzles 26 with a low ejection frequency, and unused nozzles 26 with an ejection frequency of zero, according to the printing content. In the unused nozzles, since the replacement (refresh) of the ink in the nozzles 26 by the ejection of the ink is not performed, the clogging of the nozzles 26 due to the viscosity increase of the ink in the nozzles 26 is likely to occur. The carriage 24 is regularly moved to the home position HP during printing, and all the nozzles 26 of the print head 25 perform idle ejection (also referred to as "flushing") for ejecting ink. By performing idle ejection not related to printing from all the nozzles 26 of the print head 25, clogging caused by the viscosity increase of ink in the unused nozzles is suppressed.

In this way, the carriage 24 moves to the home position HP at a predetermined time interval during printing, thereby performing idle ejection for ejecting ink from all of the nozzles 26 of the print head 25 toward the cap 48 at the home position HP. In this way, the carriage 24 moves to the home position HP, which is a standby position, in order to regularly perform idle ejection regardless of the width size of the medium M. Therefore, the exhaust mechanism 30 is provided on at least the side surface section 14A on the home position HP side of the two side surface sections 14A of the housing 14. For this reason, it is possible to generate the relatively large first airflow F1 in the vicinity of the exhaust mechanism 30 on the home position HP side at the frequency at which the carriage 24 moves to the home position HP in order to perform idle ejection.

Operations of Embodiment

Next, the operation of the printing device 11 of the present embodiment will be described.

A direction in which the carriage 24 approaches the side surface section 14A is referred to as the first direction, and a direction in which the carriage 24 moves away from the side surface section 14A is referred to as the second direction. Since the operations of the two exhaust mechanisms 30 provided on the two side surface sections 14A are the same, the operation of one exhaust mechanism 30 provided on one side surface section 14A will be described below with reference to FIG. 3 and the like. FIG. 3 shows the exhaust mechanism 30 on the home position HP side.

At the time of printing, the carriage 24 reciprocates in the main scanning direction X by the control section 100 controlling the carriage motor 42. While the carriage 24 is moving in the main scanning direction X, printing is performed on the medium M by ejecting liquid such as ink from the nozzles 26 of the print head 25. In the printing device 11 of the serial recording system, the image or the like is printed on the medium M by alternately performing a transport operation in which the transport device transports the medium M to the next printing position and a printing operation in which the print head 25 moving in the main scanning direction X performs printing for one scanning with respect to the medium M at the printing position under the control of the control section 100.

During printing, when liquid such as ink is ejected from the nozzles 26 of the print head 25, mist such as ink mist is generated. In addition, due to rubbing or the like when the medium M is transported, dust such as paper powder is generated when the medium M is paper or dust such as yarn fiber is generated when the medium M is fabric.

As shown in FIG. 3, when the carriage 24 moves in the first direction (−X) in which the carriage 24 approaches the exhaust mechanism 30, the carriage 24 pushing air in the housing 14, thereby the first airflow F1 in the same direction as the traveling direction of the carriage 24 is generated in front of the carriage 24 in the traveling direction. In the exhaust mechanism 30, when the vent valves 32 are opened by the first airflow F1, the mist and the dust in the housing 14 are discharged to the outside the housing 14 together with air through the openings 31.

When the carriage 24 moves in the second direction (+X) away from the exhaust mechanism 30, the carriage 24 draws in air behind the carriage 24 with respect to the traveling direction of the carriage 24, thereby generating the second airflow F2 in the same direction as the traveling direction of the carriage 24. In the exhaust mechanism 30, when the vent valves 32 are closed by the second airflow F2, the mist and the dust once discharged to the outside the housing 14 are prevented from re-flowing into the housing 14 through the openings 31. In addition, new dust or the like outside the housing 14 is prevented from flowing into the housing 14 together with air.

When the carriage 24 reciprocates in the main scanning direction X during printing, the mist or the dust are discharged to the outside the housing 14 from the openings 31 in front of the carriage 24 with respect to the traveling direction, and the inflow of the mist or the dust into the housing 14 from the openings 31 behind the traveling direction is suppressed.

As described above, in the first embodiment, it is possible to discharge the mist or the dust generated in the housing 14 during printing to the outside the housing 14 by using the first airflow F1 generated when the carriage 24 moves in the main scanning direction X. Furthermore, even if the second airflow F2, which is the drawing airflow generated when the carriage 24 moves in the main scanning direction X, is generated, since the vent valves 32 are closed by the second airflow F2, it is possible to suppress the re-inflow of the mist or the dust into the housing 14 and the inflow of new dust into the housing 14.

In the present embodiment, the exhaust mechanism 30 is provided at least on the side surface section 14A on the home position HP side, which is the standby position of the carriage 24, of the two side surface sections 14A. For example, when the medium M having a small width size is printed or when printing is performed so as to be concentrated on the central portion in the width direction of the medium M, the carriage 24 during printing reciprocates within the central region of the scanning area SA. In this case, since the first airflow F1 is generated only at a position away from the exhaust mechanism 30, the discharge efficiency with which the first airflow F1 discharges mist and dust inside the housing 14 to outside the housing 14 decreases. That is, it is difficult to effectively discharge the mist or the dust in the housing 14 to the outside the housing 14 by the first airflow F1.

In addition, in the printing device 11 in which the transport method of the medium M is the center alignment method, printing is mainly performed in the central region of the scanning area SA. Therefore, in the printing device 11 of the center alignment method, the relatively large first airflow F1 is less likely to be generated in the vicinity of the openings 31 than in the printing device 11 of the side alignment method. As described above, when the center alignment method, it is more difficult to effectively discharge the mist or the dust in the housing 14 to the outside the housing 14 by the first airflow F1 than when the side alignment method.

However, the carriage 24 during printing regularly moves to the home position HP, which is the standby position, and the print head 25 performs idle ejection in which liquid such as ink is ejected from all of the nozzles 26 toward the cap 48. When the idle ejection is performed, since the carriage 24 moves to the home position HP, the relatively large first airflow F1 is generated toward the exhaust mechanism 30. Therefore, even when the printing is performed only in the central region in the main scanning direction X, when the carriage 24 regularly moves to the home position HP at the same frequency as the idle ejection during the printing, it is possible to discharge the mist or the dust in the housing 14 from the openings 31 of the exhaust mechanism 30 by the relatively large first airflow F1.

Further, when the printing is finished, the carriage 24 moves to the home position HP, and the cap 48 is in contact with the nozzle surface 25A of the print head 25 at the home position HP, whereby the print head 25 is capped. At the finish of printing, since the carriage 24 moves to the home position HP, the relatively large first airflow F1 is generated toward the exhaust mechanism 30. Therefore, even when the printing is performed only in the central region in the main scanning direction X, when the carriage 24 moves to the home position HP every time one printing is finished, it is possible to discharge the mist or the dust in the housing 14 from the openings 31 of the exhaust mechanism 30 by the relatively large first airflow F1.

In this embodiment, the exhaust mechanism 30 is provided on each of the two side surface sections 14A of the housing 14. Therefore, when printing is performed on wide medium M, every time the carriage 24 moves once in the main scanning direction X, the mist or the dust generated during printing can be discharged from the openings 31 to the outside the housing 14 by the relatively large first airflow F1 generated in the vicinity of the openings 31.

Therefore, according to the first embodiment, the following effects can be obtained.

(1) The printing device 11 includes the carriage 24 that has disposed thereon the print head 25 configured to print on the medium M and that is configured to move in the main scanning direction X and the housing 14 configured to accommodate the carriage 24. the opening 31 is provided in the side surface section 14A of the housing 14 at a position that overlaps with the carriage 24 as viewed from the main scanning direction X. According to this configuration, it is possible to discharge the mist or the dust remaining in the housing 14 from the opening 31 of the side surface section 14A by using the flow of air (first airflow F1) generated by the movement of the carriage 24. Therefore, since it is not necessary to provide an exhaust device such as a fan for discharging the mist or the dust in the housing 14, the printing device 11 can be downsized as compared with a configuration provided with the exhaust device. In addition, compared to the configuration in which the exhaust device is provided, since electric power for driving the fan is not necessary, it also contributes to a reduction in the power consumption of the printing device 11.

(2) The side surface section 14A is provided with a vent valve 32 configured to open and close the opening 31. The vent valves 32, when the carriage 24 moves in a first direction approaching the opening 31, is opened by the first airflow F1 generated in front of the carriage 24 with respect to in the traveling direction of the carriage 24, and when the carriage 24 moves in a second direction away from the opening 31, is closed by the second airflow F2 generated behind the carriage 24 with respect in the traveling direction of the carriage 24. According to this configuration, when the carriage 24 moves in the first direction approaching the opening 31, the vent valves 32 open the opening 31 by the first airflow F1 generated in front of the carriage 24 in the traveling direction. Further, when the carriage 24 moves in the second direction in which it away from the opening 31, the vent valves 32 close the opening 31 by the second airflow F2 generated behind the carriage 24 with respect to the traveling direction of the carriage 24. As a result, the mist or the dust in the housing 14 can be discharged from the opening 31, and the re-inflow of the mist or the dust once discharged outside the housing 14 from the opening 31 or the inflow of new dust or the like from the outside the housing 14 can be suppressed.

(3) The carriage 24 is provided so as to be movable between a printing position at which printing is performed on the medium M and a standby position to standby when the print head 25 does not perform printing. The opening 31 is provided in the side surface section 14A to the standby position (for example, the home position HP) side in the housing 14. According to this configuration, it is possible to discharge the mist or the dust in the housing 14 from the opening 31 at a predetermined frequency regardless of the width type of the medium M. The mist or the dust in the housing 14 can be discharged from the opening 31 to the outside the housing 14 at a frequency equal to or higher than the frequency at which the carriage 24 moves to the home position HP which is the standby position after the printing is finished.

(4) The maintenance section 46 having the cap 48 is provided at a position facing the print head 25 when the carriage 24 moves to the standby position, and the carriage 24 moves regularly or irregularly to the standby position during printing, and the print head 25 performs idle ejection in which liquid is ejected toward the cap 48. According to this configuration, since the carriage 24 moves to the vicinity of the opening 31 at a frequency equal to or higher than the frequency of idle ejection performed by regularly or irregularly moving to the standby position during printing, it is possible to avoid a decrease in discharge efficiency. For example, when a configuration in which the opening 31 is provided only in the side surface section 14A on the side opposite to the standby position, there may be a case where the frequency at which the carriage 24 moves to the vicinity of the opening 31 during printing decreases. In this case, there is a possibility that the discharge efficiency of the mist or the dust in the housing 14 is reduced. On the other hand, since the carriage 24 moves to the vicinity of the opening 31 at a frequency equal to or higher than the frequency of the idle ejection during printing, it is easy to avoid a decrease in the discharge efficiency.

Second Embodiment

Next, the exhaust mechanism 30 of a second embodiment will be described with reference to FIGS. 7 to 9. In the second embodiment, only the configuration of the exhaust mechanism 30 is different from that of the first embodiment, and the other configurations of the printing device 11 are basically the same as those of the first embodiment. Therefore, the configuration of the exhaust mechanism 30 will be mainly described.

Figure 7:
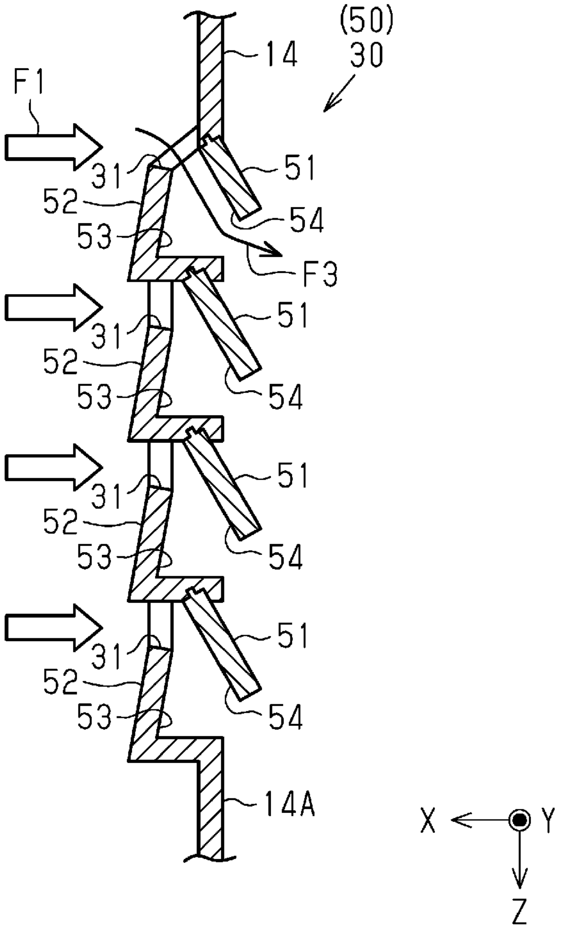
FIG. 7 is a schematic front cross-sectional view showing the exhaust mechanism of a second embodiment and showing the exhaust operation when the carriage moves in a direction approaching the exhaust mechanism.
Figure 8:
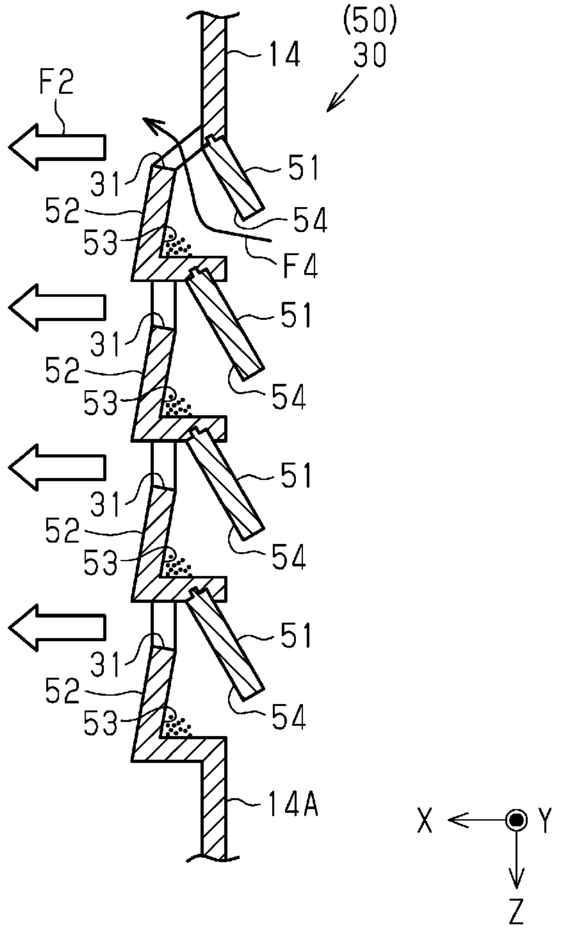
FIG. 8 is a schematic front cross-sectional view showing the inflow suppressing operation when the carriage moves in a direction away from the exhaust mechanism.

As shown in FIG. 7, the exhaust mechanism 30 of the embodiment has a configuration that does not include the vent valve 32. The side surface section 14A is provided with bending flow paths 54 formed by bending a flow path communicating with the openings 31. The exhaust mechanism 30 of the second embodiment is configured by an exhaust structure 50 that forms the bending flow paths 54. The exhaust structure 50 realizes, by the bending flow paths 54, discharge of the mist and the dust (hereinafter, also referred to as "mist or the like") from inside the housing 14 by the first airflow F1 and suppression of re-inflow of the mist or the like from outside the housing 14 by the second airflow F2.

As shown in FIG. 7, the exhaust structure 50 includes a first surface section 51 and a second surface section 52 that is disposed on the inner side of the housing 14 with respect to the first surface section 51 at a predetermined distance in the main scanning direction X and that partially overlaps the first surface section 51 in the height direction −Z, which intersects the main scanning direction X. The openings 31 are provided between the first surface section 51 and the second surface section 52.

The first surface section 51 is provided obliquely so as to spread from the side surface section 14A to the outside the housing 14. The lower end portion of the first surface section 51 is positioned outside the housing 14 with respect to the upper end portion.

The second surface section 52 is provided such that its the upper side is inclined toward outside. The second surface section 52 of the present embodiment has a substantially L-shaped cross section in the front view shown in FIG. 7. A recess section 53 is formed in an outer corner portion of the second surface section 52 having a substantially L-shape.

Figure 9:
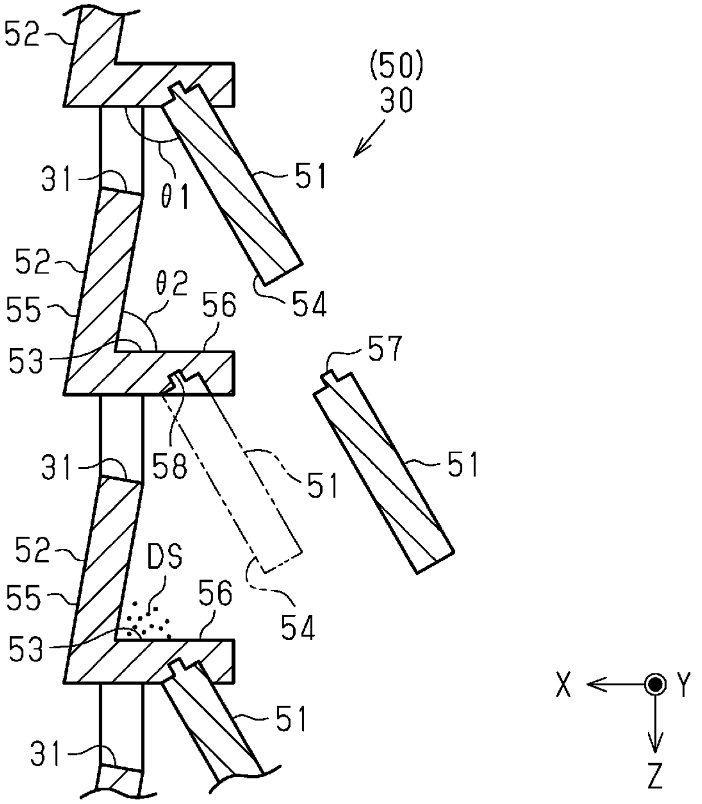
FIG. 9 is an enlarged schematic front cross-sectional view of the exhaust mechanism.

As shown in FIG. 9, the second surface section 52 includes a first plate section 55 extending along the vertical direction Z and a second plate section 56 extending substantially horizontally from a lower end portion of the first plate section 55. The first plate section 55 and the second plate section 56 form the second surface section 52 having a substantially L-shape as viewed from the front.

An upper end portion of the first surface section 51 is connected to the second plate section 56 constituting the second surface section 52. The first surface section 51 spreads outward with respect to the vertical direction Z so that the lower end portion of the first surface section 51 is positioned on outside (−X direction side in FIG. 9) the housing 14 with respect to the upper end portion of the first surface section 51. The opening 31 is formed between the upper end surface of the first plate section 55 and the lower surface of the second plate section 56. Note that the position where the opening 31 is formed is also between the first surface section 51 and the second surface section 52.

A first angle θ1 which is an angle formed by the lower surface of the second plate section 56 and the inner surface of the first surface section 51, is an obtuse angle. The first surface section 51 spreads outward such that the first angle θ1 is an obtuse angle. Therefore, as shown in FIG. 7, by being guided from the opening 31 along the first surface section 51, the first airflow F1 is discharged as the third airflow F3 is directed obliquely downward.

As shown in FIG. 9, the second surface section 52 having a substantially L-shape in the front view has a shape in which the first plate section 55 is slightly inclined in a direction in which the first plate section 55 approaches the second plate section 56. For this reason, a second angle θ2 which is an angle formed by the outer surface of the first plate section 55 and the upper surface of the second plate section 56 which form the recess section 53, is an acute angle. As shown in FIG. 8, when the second airflow F2 is generated in the housing 14, from the outside the housing 14, the obliquely upward fourth airflow F4 that is guided along the first surface section 51 and reaches the opening 31 flows in from the opening 31. Since the first plate section 55 is slightly inclined outward, the first plate section 55 serves as a kind of barrier in the middle of the fourth airflow F4 reaching the opening 31. Therefore, the dust DS or the like contained in the fourth airflow F4 are likely to accumulate in the recess section 53 positioned in front of the first plate section 55.

Further, as shown in FIG. 9, the first surface section 51 is detachably and attachably provided. The first surface section 51 has a locking protrusion 57 at the tip end section. Further, the second surface section 52 has a locking recess section 58 in a portion to which the tip end section of the first surface section 51 is connected. The first surface section 51 is connected with respect to the second surface section 52 in a state of extending obliquely downward at the first angle θ1 which is an obtuse angle, by locking between the locking protrusion 57 and the locking recess section 58.

On the other hand, when the dust DS or the like accumulated in the recess section 53 is removed, as shown in FIG. 9, the first surface section 51 is detached from the second surface section 52. As a result, the cleaning work for removing the dust DS or the like accumulated in the recess section 53 is facilitated.

Therefore, according to the second embodiment, the following effects can be obtained in addition to the same effects (1), (3), and (4) as in the first embodiment.

(5) The side surface section 14A is provided with the bending flow path 54 that communicates with the opening 31. According to this configuration, even if the mist or the dust once discharged from the housing 14 is included in the airflow flowing in from outside the housing 14, the mist or the dust is easily accumulated in the bent portion (the recess section 53) of the bending flow path 54. As a result, the mist or the dust once discharged from the housing 14 can be prevented from re-flowing into the housing 14. For example, since a valve structure such as the vent valve 32 in the first embodiment is not required, a simpler configuration than that of the first embodiment is sufficient.

(6) The side surface section 14A includes the first surface section 51 and the second surface section 52 that is disposed at a predetermined distance from the first surface section 51 in the main scanning direction X and that partially overlaps the first surface section 51 in the height direction −Z, which intersects the main scanning direction X. The opening 31 is provided between the first surface section 51 and the second surface section 52. According to this configuration, the bending flow path 54 can be formed in the side surface section 14A by the arrangement of the first surface section 51 and the second surface section 52. Therefore, with a simple configuration, it is possible to suppress the re-inflow of the mist or the dust once discharged from the housing 14 into the housing 14 or the inflow of new dust or the like from outside the housing 14.

(7) The first surface section 51 is provided obliquely with respect to the side surface section 14A so as to spread to outside the housing 14. The second surface section 52 is provided such that its the upper side is inclined toward outside the housing 14. According to this configuration, since the first surface section 51 is provided obliquely so as to spread outside the housing 14, the airflow easily goes out the housing 14. Since the second surface section 52 is provided such that the upper side thereof inclined toward the outside the housing 14, the mist or the dust in the airflow flowing in from the opening 31 is likely to accumulate on the outside the second surface section 52. Therefore, the mist or the dust in the housing 14 can be effectively discharged, and the re-inflow of the mist or the dust once discharged from the housing 14 into the housing 14 or the inflow of new dust or the like from outside the housing 14 can be effectively suppressed.

(8) The first surface section 51 is detachably and attachably provided. According to this configuration, detaching the first surface section 51 facilitates the collection of mist or the dust accumulated outside the second surface section 52.

Third Embodiment

Next, the exhaust mechanism 30 according to a third embodiment will be described with reference to FIG. 10. In the third embodiment, the configuration of the exhaust mechanism 30 is different from those of the first and second embodiments, and the other basic configuration of the printing device 11 is the same as that of the first embodiment.

Figure 10:
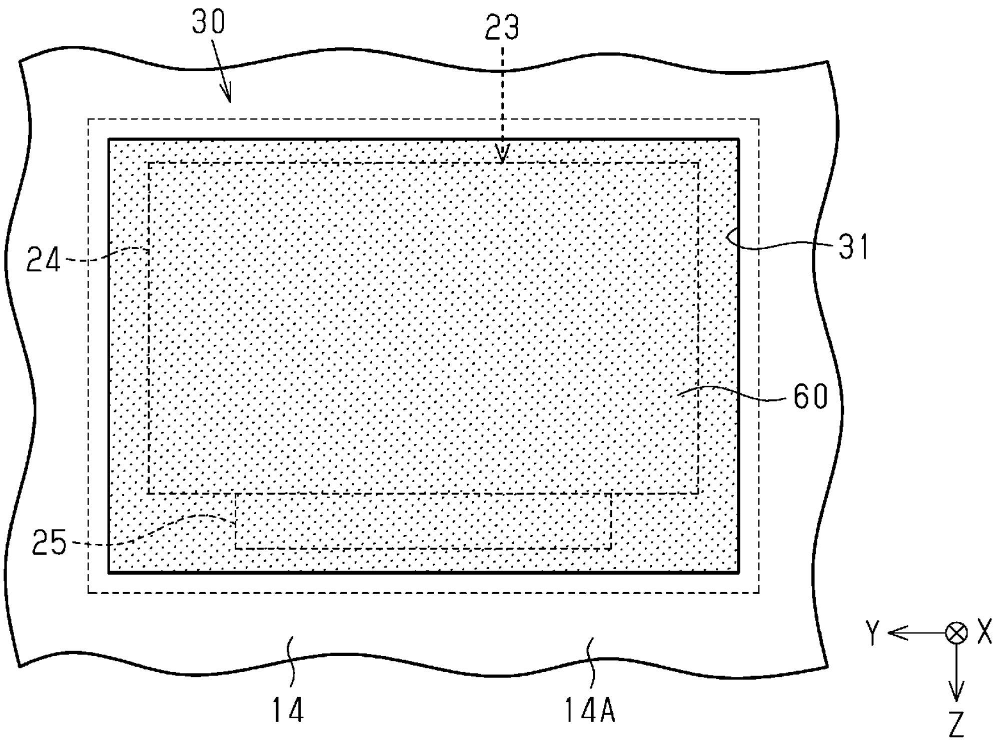
FIG. 10 is a schematic side view showing the exhaust mechanism of a third embodiment.

As shown in FIG. 10, the opening 31 may be one large opening formed in the side surface section 14A. The carriage 24 may be provided inside the peripheral edge of the opening 31 as viewed from the main scanning direction X. Therefore, when the carriage 24 moves in the first direction approaching the opening 31, the first airflow F1 generated in front of the carriage 24 in the traveling direction can be efficiently discharged from the opening 31. As a result, it is possible to efficiently discharge the mist or the dust in the housing 14 by using the airflow generated when the carriage 24 moves. Further, the opening 31 may be provided with a filter 60.

Therefore, according to the third embodiment, the following effects can be obtained.

(9) The carriage 24 is provided inside the peripheral edge of the opening 31 as viewed in the main scanning direction X. According to this configuration, the airflow generated in front in the traveling direction by pushing air in the process at which the carriage 24 moves can effectively increase the ventilation amount passing through the opening 31. Therefore, it is possible to increase the discharge efficiency when the mist or the dust in the housing 14 is discharged.

(10) The opening 31 is provided with the filter 60. According to this configuration, when the carriage 24 moves in the second direction away from the opening 31 in the housing 14, the carriage 24 draws in air, and thus the airflow that flows in through the opening 31 passes through the filter 60 due to the second airflow F2 that is generated behind the carriage 24 with respect to the traveling direction of the carriage 24. Therefore, the mist or the dust re-inflow of the mist or the dust once discharged from the housing 14 into the housing 14 or the inflow of new dust or the like from outside the housing 14 can be suppressed.

The above described embodiments may be modified into the following modifications. Further, an appropriate combination of the above described embodiments and modifications described below may be used as a further modification, and an appropriate combination of modifications described below may be used as a further modification.

- In each embodiment, the exhaust mechanism 30 may be provided in only one of the two side surface sections 14A. For example, the exhaust mechanism 30 may be provided only on the side surface section 14A to the standby position side of the carriage 24 among the two side surface sections 14A, or the exhaust mechanism 30 may be provided only on the side surface section 14A on the opposite side to the standby position of the carriage 24. Even in this configuration, when the carriage 24 moves in a direction approaching the exhaust mechanism 30, the mist or the dust in the housing 14 can be discharged from the opening 31 to outside the housing 14.
- In the first embodiment, the configuration in which the opening 31 is covered when the vent valve 32 is in the valve closed state may be a configuration in which one vent valve 32 covers all of the plurality of openings 31, or a configuration in which the plurality of vent valves 32 cover each of the openings 31. Further, the number of the openings 31 in the side surface section 14A may be one, and one of the vent valves 32 may cover one of the openings 31. Further, one opening 31 may be covered with a plurality of vent valves 32.
- In the first embodiment, the type of the vent valve 32 may be appropriately selected as long as it is configured to valve open at the first airflow F1 and valve close at the second airflow F2.
- In the first embodiment, the vent valve 32 may be disposed inside the side surface section 14A as long as it can be configured to valve open by the first airflow F1 and valve close by the second airflow F2.
- In the first embodiment, the vent valve 32 may be biased in the closing direction by an elastic member such as a spring.
- In the first embodiment, a cover for covering the side surface section 14A and the vent valve 32 may be provided outside the side surface section 14A the housing 14. The cover may be provided with a vent hole such as a slit hole at a portion corresponding to the opening 31 and the vent valve 32. With this configuration, the vent valve 32 can be protected as compared with a configuration in which the vent valve 32 is exposed to the outside.
- In the second embodiment, the carriage 24 may be provided inside the edge of the opening 31 as viewed from the main scanning direction X. That is, the bending flow path 54 of the second embodiment may be combined with the opening 31 of the third embodiment. Even if there is only one opening 31 having such a large size, it is possible to efficiently discharge the mist or the dust in the housing 14, and it is possible to suppress the mist or the dust from re-flowing due to the bending flow path 54.
- In the second embodiment, the direction of the third airflow F3 guided by the bending flow path 54 and discharged is not limited to the obliquely downward direction and may be an obliquely upward direction, an obliquely rearward direction, an obliquely forward direction, or the like.

The vent valve 32 of the first embodiment and the bending flow path 54 of the second embodiment may be combined.

The printing device 11 is not limited to a liquid ejecting device such as an inkjet printing device. In printing devices other than the liquid ejecting device, there are cases where it is desirable to discharge dust generated from the medium M, such as paper powder and yarn fiber, outside the housing 14, although no mist is generated during printing. The exhaust mechanism 30 may be provided in a printing device that requires such discharge. Therefore, the printing device 11 may be a laser printing device (laser printer), a dot impact printing device (dot impact printer), a thermal printing device, or the like. These printing devices can discharge the dust such as paper powder or yarn fiber generated from the medium M to outside the housing 14 from the opening 31 of the exhaust mechanism 30 using the airflow generated according to the movement of the carriage 24.

The medium M is not limited to a medium M such as paper and may be a fabric such as cloth or nonwoven fabric, a film or a sheet made of a synthetic resin, a laminated medium, or the like.

The printing device 11 may be a textile printing device. The textile printing device may be an inkjet printing method.

Hereinafter, technical ideas grasped from the embodiments and the modification examples will be described together with the effects.

(A) A printing device includes a carriage that has disposed thereon a print head configured to print on a medium and that is configured to move in the main scanning direction and a housing configured to accommodate the carriage, wherein an opening is provided in one side surface section amongst two side surface sections of the housing that face each other in the main scanning direction at a position that overlaps with the carriage as viewed from the main scanning direction.

According to this configuration, it is possible to discharge the mist or the dust in the housing from the opening of the side surface section by using the flow of air (airflow) generated by the movement of the carriage. Therefore, it is not necessary to provide an exhaust device such as a fan for discharging the mist or the dust in the housing. Therefore, it is possible to reduce the size of the printing device compared to a configuration including the exhaust device. In addition, compared to the configuration in which the exhaust device is provided, since electric power for driving the fan is not necessary, it also contributes to a reduction in the power consumption of the printing device.

(B) In the printing device according to (A) may be such that the side surface section is provided with a vent valve configured to open and close the opening and the vent valve, when the carriage moves in a direction approaching the opening, is opened by a first airflow generated in front of the carriage with respect to the traveling direction of the carriage, and when the carriage moves in a direction away from the opening, is closed by a second airflow generated behind the carriage with respect to the traveling direction of the carriage.

According to this configuration, when the carriage moves in the first direction approaching the opening, the vent valves open the opening by the first airflow in the same direction as the traveling direction generated in front of the carriage in the traveling direction. Further, when the carriage moves in the second direction away from the opening, the vent valves close the opening by the second airflow generated in the same direction as the traveling direction behind the carriage with respect to the traveling direction of the carriage. As a result, the mist or the dust in the housing can be discharged from the opening, and the re-inflow of the mist or the dust once discharged outside the housing from the opening can be suppressed.

(C) In the printing device according to (A) may be such that the side surface section is provided with a bending flow path that communicates with the opening.

According to this configuration, even if the mist or the dust once discharged from the housing is included in the airflow flowing in from outside the housing, the mist or the dust is easily accumulated in the bent portion of the bending flow path. As a result, entry of the mist or the dust into the housing can be suppressed. For example, since a valve structure such as a vent valve is not required, a simpler configuration than a configuration having a valve structure is sufficient.

(D) In the printing device according to (C) may be such that the side surface section includes a first surface section and a second surface section that is disposed at a predetermined distance from the first surface section on the inner side of the housing in the main scanning direction and that partially overlaps the first surface section in the height direction, which intersects the main scanning direction, the opening is provided between the first surface section and the second surface section, and the bending flow path is formed between the first surface section and the second surface section.

According to this configuration, the bending flow path communicating with the opening is formed between the first surface section and the second surface section in the side surface section. Therefore, with a simple configuration, the mist or the dust can be discharged from the inside the housing, and the mist or the dust once discharged from the inside the housing can be prevented from re-flowing into the housing.

(E) In the printing device according to (D) may be such that the first surface section is provided obliquely with respect to the side surface section so as to spread to outside the housing, and the second surface section is provided such that its upper side is inclined toward outside the housing.

According to this configuration, since the first surface section is provided obliquely so as to spread outside the housing, the airflow easily goes out the housing. Since the second surface section is provided such that the upper side thereof inclined toward the outside the housing, the mist or the dust in the airflow flowing in from the opening is likely to accumulate on the outside the second surface section. Therefore, the mist or the dust in the housing can be effectively discharged, and the re-inflow of the mist or the dust once discharged from the housing into the housing can be effectively suppressed.

(F) In the printing device according to (D) or (E) may be such that the first surface section is detachably and attachably provided.

According to this configuration, detaching the first surface section facilitates the collection of mist or the dust accumulated outside the second surface section.

(G) In the printing device according to (A) to (F) may be such that the carriage is provided so as to be movable between a printing position at which printing is performed on the medium and a standby position to standby when the printing head does not perform printing and the opening is provided in the side surface section to the standby position side of the housing.

According to this configuration, it is possible to discharge the mist or the dust in the housing from the opening at a predetermined frequency regardless of the width type of the medium. For example, when the printing is finished, the carriage moves to the vicinity of the opening toward the standby position, and thus the frequency at which the mist or the dust in the housing can be discharged with high discharge efficiency increases.

(H) In the printing device according to (G) may further include a maintenance section that is disposed at a position facing the print head when the carriage moves to the standby position and that has a cap, wherein the carriage moves regularly or irregularly to the standby position during printing, and the print head performs idle ejection in which liquid is ejected toward the cap.

According to this configuration, since the carriage moves to the vicinity of the opening at a frequency equal to or higher than the frequency of idle ejection performed by regularly or irregularly moving to the standby position during printing, it is possible to avoid a decrease in discharge efficiency. For example, when a configuration in which the opening is provided only in the side surface section on the side opposite to the standby position, there may be a case where the frequency at which the carriage moves to the vicinity of the opening during printing decreases. In this case, there is a possibility that the discharge efficiency of the mist or the dust in the housing 14 is reduced. On the other hand, in this configuration, since the carriage moves to the vicinity of the opening at a frequency equal to or higher than the frequency of the idle ejection during printing, it is easy to avoid a decrease in the discharge efficiency.

(I) In the printing device according to (A) to (F) may be such that the carriage is provided inside the edge of the opening as viewed from the main scanning direction.

According to this configuration, the airflow generated in front in the traveling direction by pushing air in the process at which the carriage moves can effectively increase the ventilation amount passing through the opening. Therefore, it is possible to increase the discharge efficiency when the mist or the dust in the housing is discharged.

(J) In the printing device according to (I) may be such that the opening is provided with a filter.

According to this configuration, when the carriage moves in the second direction away from the opening in the housing, even if the carriage draws in air and thus the second airflow (drawing airflow) that is generated behind the carriage with respect the traveling direction of the carriage, the second airflow flowing in through the opening passes through the filter. Therefore, the mist or the dust once discharged from the housing can be prevented from reflowing into the housing.

What is claimed is:

1. A printing device comprising:

a carriage that has disposed thereon a print head configured to print on a medium and that is configured to move in the main scanning direction; and a housing configured to accommodate the carriage and has two side surface sections positioned at each end of the housing in the main scanning direction, such that when the carriage moves in the main scanning direction, the carriage moves away from one of the two side surface sections towards the other of the two side surface section, wherein a side surface opening is provided in one side surface section amongst the two side surface sections, the side surface opening at a position that overlaps with the carriage as viewed along the main scanning direction.

2. The printing device according to claim 1, wherein the side surface section is provided with a vent valve configured to open and close the opening and the vent valve, when the carriage moves in a direction approaching the opening, is opened by a first airflow generated in front of the carriage with respect to the traveling direction of the carriage, and when the carriage moves in a direction away from the opening, is closed by a second airflow generated behind the carriage with respect to the traveling direction of the carriage.

3. The printing device according to claim 1, wherein the side surface section is provided with a bending flow path that communicates with the opening.

4. The printing device according to claim 1, wherein the side surface section includes a first surface section and a second surface section that is disposed at a predetermined distance from the first surface section on the inner side of the housing in the main scanning direction and that partially overlaps the first surface section in the height direction, which intersects the main scanning direction, the opening is provided between the first surface section and the second surface section, and the bending flow path is formed between the first surface section and the second surface section.

5. The printing device according to claim 1, wherein the first surface section is provided obliquely with respect to the side surface section so as to spread to outside the housing, and the second surface section is provided such that its upper side is inclined toward outside the housing.

6. The printing device according to claim 1, wherein the first surface section is detachably and attachably provided.

7. The printing device according to claim 1, wherein the carriage is provided so as to be movable between a printing position at which printing is performed on the medium and a standby position to standby when the printing head does not perform printing and the opening is provided in the side surface section to a standby position side of the housing.

8. The printing device according to claim 7, further comprising:

a maintenance section that is disposed at a position facing the print head when the carriage moves to the standby position and that has a cap, wherein the carriage moves regularly or irregularly to the standby position during printing, and the print head performs idle ejection in which liquid is ejected toward the cap.

9. The printing device according to claim 1, wherein the carriage is provided inside the edge of the opening as viewed from the main scanning direction.

10. The printing device according to claim 9, wherein the opening is provided with a filter.

11. A printing device comprising:

a carriage that has disposed thereon a print head configured to print on a medium and that is configured to move in the main scanning direction; and a housing configured to accommodate the carriage, wherein an opening is provided in one side surface section amongst two side surface sections of the housing that face each other in the main scanning direction at a position that overlaps with the carriage as viewed from the main scanning direction, the side surface section is provided with a vent valve configured to open and close the opening and the vent valve, when the carriage moves in a direction approaching the opening, is opened by a first airflow generated in front of the carriage with respect to the traveling direction of the carriage, and when the carriage moves in a direction away from the opening, is closed by a second airflow generated behind the carriage with respect to the traveling direction of the carriage.

12. The printing device according to claim 11, wherein the side surface section is provided with a bending flow path that communicates with the opening.

13. The printing device according to claim 11, wherein the side surface section includes a first surface section and a second surface section that is disposed at a predetermined distance from the first surface section on the inner side of the housing in the main scanning direction and that partially overlaps the first surface section in the height direction, which intersects the main scanning direction, the opening is provided between the first surface section and the second surface section, and the bending flow path is formed between the first surface section and the second surface section.

14. The printing device according to claim 11, wherein the first surface section is provided obliquely with respect to the side surface section so as to spread to outside the housing, and the second surface section is provided such that its upper side is inclined toward outside the housing.

15. The printing device according to claim 11, wherein the carriage is provided so as to be movable between a printing position at which printing is performed on the medium and a standby position to standby when the printing head does not perform printing and the opening is provided in the side surface section to a standby position side of the housing.

16. The printing device according to claim 11, wherein the first surface section is detachably and attachably provided.

17. The printing device according to claim 16, further comprising:

a maintenance section that is disposed at a position facing the print head when the carriage moves to the standby position and that has a cap, wherein the carriage moves regularly or irregularly to the standby position during printing, and the print head performs idle ejection in which liquid is ejected toward the cap.

18. The printing device according to claim 11, wherein the carriage is provided inside the edge of the opening as viewed from the main scanning direction.

19. The printing device according to claim 18, wherein the opening is provided with a filter.

* * * * *